United States Patent

[11] 3,599,930

| [72] | Inventors | Michel Philippe Lucien Bourgeot;<br>Guy Ferrand, both of Bourges, France |
|---|---|---|
| [21] | Appl. No. | 16,299 |
| [22] | Filed | Mar. 4, 1970 |
| [45] | Patented | Aug. 17, 1971 |
| [73] | Assignee | Etat Francais Delegation Ministerielle four l'Armement<br>Paris, France |
| [32] | Priority | Mar. 4, 1969 |
| [33] | | France |
| [31] | | 6905755 |

[54] RAPID OPENING HIGH PRESSURE HYDRAULIC VALVE
10 Claims, 2 Drawing Figs.

| [52] | U.S. Cl. | 251/73 |
|---|---|---|
| [51] | Int. Cl. | F16k 31/44 |
| [50] | Field of Search | 251/66, 73 |

[56] References Cited
UNITED STATES PATENTS

| 2,869,579 | 1/1959 | Wilk et al. | 251/73 X |
|---|---|---|---|
| 3,229,713 | 1/1966 | Wiegand | 251/73 X |
| 3,512,549 | 5/1970 | Wiegand | 251/73 X |

*Primary Examiner*—Henry T. Klinksiek
*Attorney*—Waters, Roditi, Schwartz & Nissen ABSTRACT: A high-pressure hydraulic valve includes a piston in a supply cylinder to control feed of a high-pressure liquid via outlets in the cylinder. The piston is connected via a toggle linkage to a resistance arrangement including a further piston acting on an air cushion in a respective cylinder. The toggle linkage substantially diminishes the stress from the supply piston to the resistance arrangement and makes possible rapid opening of the outlets in extremely short time for high flows at high pressure.

RAPID OPENING HIGH PRESSURE HYDRAULIC VALVE

BRIEF SUMMARY OF THE INVENTION

The invention relates to hydraulic valves and particularly to rapid-opening, high-pressure and high-outflow valves.

In accordance with the invention a feedline for the fluid is controlled by a piston held in closed position by a linkage locked in unstable equilibrium. The linkage is unlocked by a small external force to permit opening of the feedline. The linkage is connected to a resistance means which cushions displacement of the piston and the linkage is constructed as a toggle arrangement to substantially reduce the force transmitted from the piston to the resistance means. The toggle arrangement is especially adapted to rapid piston movement at high pressure since this is converted to slower movement at much lower pressures on the resistance means.

DETAILED DESCRIPTION

Figure 1:
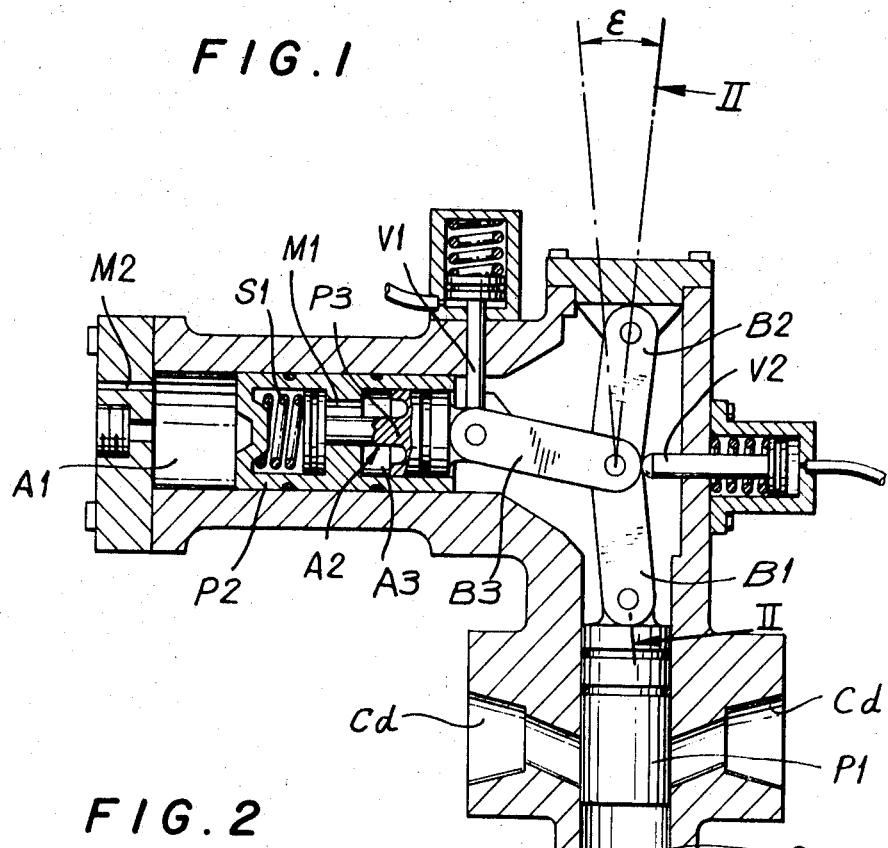
FIG. 1 is a longitudinal sectional view through a valve according to the invention.
Figure 2:
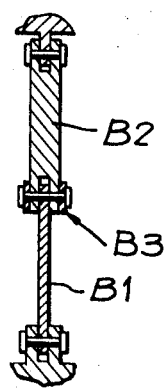
FIG. 2 is a sectional view taken on line II-II in FIG. 1.

Referring to the drawing therein is seen a feed pipe $Ca$ of circular cross section containing a high-pressure fluid. The fluid is intended for selective discharge to delivery conduits $Cd$ and a piston $P1$ is slidably mounted within the feed pipe $Ca$ to control the outflow of the high-pressure fluid to the delivery conduits. The piston in the position shown in FIG. 1 seals the delivery conduits and in this respect the piston is either carefully machined and placed within the feed pipe with close tolerances or sealing piston rings (not shown) may be employed. The piston is adapted to seal pressure of the order of 300 bars.

A series of links $B1$, $B2$ and $B3$ is connected to the piston to hold the same in an unstable closed position as shown in FIG. 1.

A safety lock $V1$ acts on link $B3$ to hold the linkage in its locked condition and the safety lock can be controlled, as shown in FIG. 1 by a pneumatic jack, or other suitable control means.

A release pawl $V2$ acts on link $B3$ to position the linkage and aid in its locking and the pawl $V2$ is also controlled by a pneumatic jack, as shown in FIG. 1, or by any other suitable control means.

The link $B3$ is connected to a resistance means constituted by a hollow piston $P2$ which is displaceable against an air cushion in a chamber $A1$, said resistance means being connected to link $B3$ through dashpot arrangement $A2$. The dashpot arrangement includes a slidable member $P3$ which is acted on by a spring $S1$ and which acts on fluid contained in a chamber $A3$ within the hollow piston $P2$ to wiredraw liquid through a gauged orifice $M1$.

An orifice $M2$ is optionally provided in the end wall of the cylinder containing piston $P2$ for the purpose of regulating automatic closure of the valve depending on whether orifice $M2$ is open or closed.

The arrangement of links $B1$, $B2$ and $B3$ forms a toggle linkage wherein links $B1$ and $B2$ are inclined at a relatively small angle $\epsilon$ in the unstable locked position shown in FIG. 1. This angle is of the order of several degrees, and as a consequence, the force which is transmitted from piston $P1$ to the resistance means will be substantially diminished. Moreover, the toggle linkage is especially adapted to permit rapid piston movement at high pressure and to convert this to slower movement at much lower pressures on the resistance means.

In operation, pressure is established in the feed pipe $Ca$ to apply force on the piston $P1$ which is held in the position shown in FIG. 1 by the lock $V1$ and pawl $V2$. The valve is opened by retracting lock $V1$ and pawl $V2$ for working pressures less than 150 bars and by withdrawing only lock $V1$ for pressures exceeding 150 bars. Under the effect of the pressure in feed pipe $Ca$ piston $P1$ rapidly displaces upwards in feed pipe $Ca$ quickly exposing the orifices leading to discharge duct $Cd$ whereby the valve is opened. During this movement of the piston $P1$, the toggle linkage collapses slightly and the resistance means undergoes stress. The dashpot means receives the load from the linkage via link $B3$ and the piston $P2$ travels to the left in FIG. 1 to compress the air contained in chamber $A1$ which effectively brakes the displacement of piston $P1$. The impact of the resistance unit is substantially diminished by wiredraw of the fluid contained in chamber $A3$ through the gauged orifice $M1$ of the dashpot.

The valve is kept open by the pressure present in feed pipe $Ca$ throughout the flow and it is automatically closed or not depending on whether gauged orifice $M2$ was previously open or not. Specifically, with $M2$ closed and the pressure in feed pipe $Ca$ released, the compressed air in chamber $A3$ of the resistance means will act on the linkage to return the piston $P1$ to the position shown in FIG. 1 whereupon lock $V1$ and pawl $V2$ are extended to again hold the linkage in this initial position. If orifice $M2$ was open and the air cushion in chamber $A1$ had escaped, then it would be necessary to provide additional means to inject pressure fluid into chamber $A3$, to return the valve to its closed position as shown in FIG. 1.

Operation of the valve automatically at a particular frequency can be obtained by applying a suitable initial air pressure in chamber $A1$.

Working of the valve by automatic opening and closing cycles of set frequency is obtained by applying a suitable initial air pressure in chamber $A1$.

As a nonrestrictive example, the following characteristics are given for a 75 mm. bore valve in feed pipe $Ca$:

| | |
|---|---|
| Maximum working pressure | 500 kg./cm.$^2$ |
| P1 bore | 75 mm. |
| P2 bore | 100 mm. |
| M1 bore | 3 mm. |
| M2 bore | 2 mm. |
| Open time | 0.002 seconds |
| Discharge for pressure of 300 kg./cm.$^2$ | 5000 liters/sec. |
| Angle $\epsilon$ | 2° |
| Maximum shearing force on V1 | 10$^4$N |
| Force to be applied by V2 | 10$^3$N |
| Initial air pressure in A1 | |
| on controlled closure—open M2 | 1 kg./cm.$^2$ |
| on automatic closure—closed M2 | 3 kg./cm.$^2$ |
| on automatic open-and-close cycle | 15 kg./cm.$^2$ |
| duration of cycle | 0.5 sec. |

The valve is primarily for use with liquids but can be used equally well with gases in its various methods of operation.

What I claim is:

1. A rapid opening high-pressure valve comprising a displaceable piston subjected to the pressure of a fluid and controlling release of the pressure fluid by displacement thereof, a linkage coupled to said piston and having locked and unlocked states, and resistance means coupled to said linkage to cushion displacement of the piston, said linkage being initially in said locked state and constituting means to substantially reduce the force transmitted from said piston to said resistance means when unlocked.

2. A valve as claimed in claim 1 wherein said linkage comprises a plurality of links connected together as a toggle linkage.

3. A valve as claimed in claim 2 wherein said links include two links hinged together and out of alignment by a small angle, one of said two links being pivotably connected to said piston, the other of said two links being hinged to a fixed point, and a third link connected to said first two links at the point of connection thereof and in turn pivotably connected to said resistance means.

4. A valve as claimed in claim 3 wherein said small angle is about 2°.

5. A valve as claimed in claim 2 wherein said resistance means comprises a further piston, and a cylinder in which said further piston is slidably supported against an air cushion.

6. A a valve as claimed in claim 5 wherein said resistance means comprises dashpot means between said linkage and said further piston.

7. A valve as claimed in claim 6 wherein said further piston is hollow and contains separated chambers with liquid therein and a calibrated orifice between the chambers, said dashpot means including a slidable member in one of said chambers.

8. A valve as claimed in claim 7 wherein said dashpot means further comprises spring means in the other of said chambers for resisting displacement of said slidable member.

9. A valve as claimed in claim 5 wherein said cylinder containing the further piston has a gauged orifice for the flow of air to and from the air cushion.

10. A valve as claimed in claim 2 comprising selectively operable locking means acting on said linkage to release or lock the same, said linkage when unlocked being in a position of unstable equilibrium whereby under the pressure of the fluid it will permit displacement of the piston and release of the fluid.